United States Patent
Lester et al.

(10) Patent No.: US 7,345,777 B2
(45) Date of Patent: Mar. 18, 2008

(54) RECALLING CANCELLED PRINT JOBS

(75) Inventors: Samuel M. Lester, Boise, ID (US); Jimmy Sfaelos, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1278 days.

(21) Appl. No.: 09/954,350

(22) Filed: Sep. 17, 2001

(65) Prior Publication Data

US 2003/0053109 A1   Mar. 20, 2003

(51) Int. Cl.
  *G06K 15/00*  (2006.01)
  *H04N 1/00*  (2006.01)
(52) U.S. Cl. ............... 358/1.14; 358/437; 358/404
(58) Field of Classification Search ............. 358/401, 358/501, 400, 1.15, 1.18, 1.14, 437, 468, 358/471
  See application file for complete search history.

(56) References Cited

U.S. PATENT DOCUMENTS

| | | | |
|---|---|---|---|
| 5,873,659 A * | 2/1999 | Edwards et al. ............. | 400/61 |
| 5,982,994 A | 11/1999 | Mori et al. | |
| 6,139,177 A | 10/2000 | Venkatraman et al. | |
| 6,443,841 B1 * | 9/2002 | Rossides ...................... | 463/25 |
| 6,483,508 B1 * | 11/2002 | Ishikawa ..................... | 345/420 |
| 6,516,416 B2 * | 2/2003 | Gregg et al. ................ | 713/201 |
| 2001/0015812 A1 * | 8/2001 | Sugaya ....................... | 358/1.1 |
| 2002/0196460 A1 * | 12/2002 | Parry ......................... | 358/1.15 |

FOREIGN PATENT DOCUMENTS

| | | |
|---|---|---|
| JP | 08-058158 | 3/1996 |
| JP | 11-143665 | 5/1999 |
| JP | 2000-20261 | 1/2000 |
| JP | 2002-248841 | 9/2002 |

* cited by examiner

Primary Examiner—Jerome Grant, II

(57) ABSTRACT

When a print job is canceled, the printer saves the print job for potential subsequent retrieval. The printer implements a user interface that allows a user to select from previously cancelled print jobs, and to recall such print jobs for subsequent printing.

29 Claims, 3 Drawing Sheets

RECALLING CANCELLED PRINT JOBS

TECHNICAL FIELD

The present invention relates to print devices and, more particularly, to methods and systems for canceling print jobs received by a print device.

BACKGROUND

When using a printer with a computer, a situation sometimes arises in which a print job is sent to the printer and it is later desired to cancel the print job. In some cases, the print job can be canceled from the computer. In other cases, it may be too late to cancel the job from the computer, and it may be necessary to interact with the printer in order to cancel the job.

Many printers have a "cancel" button that a user presses to cancel the print job that is currently being processed. The ability to cancel the current print job is effective and sufficient in many situations. However, the simple functionality of a cancel button can create frustrations in other situations.

One particular situation in which the cancel key sometimes creates frustration is when a printer is shared among users of a workgroup. In situations such as this, it sometimes happens that a first user initiates a print job and that a second user later cancels the print job against the wishes of the first user. This might be done for a variety of reasons, the most likely of which is that the print job of the first user is lengthy and is holding up the print job of the second user, and that the second user has simply become impatient with the wait.

A similar situation arises when a particular print job requires some type of special print media that must be loaded manually into the printer before the print job can proceed. In situations like this, where a print job is stalled as it waits for a user to load special print media, it is possible for multiple print jobs to become queued, all waiting for the stalled print job. Users other than the user that submitted the original print job may have no interest in loading the special print media, and may instead simply cancel the stalled print job in order to expedite processing of their own print jobs.

In either situation, the owner of the original, canceled print job eventually makes his or her way to the workgroup printer only to find that his or her print job has been canceled. As a result, this user must make the trip back to his or her office, reformat the desired document, and resubmit it to the workgroup printer.

The invention described below alleviates some of the frustration that can be associated with situations such as those described above.

SUMMARY

In response to a user instruction to cancel a print job, the print devices described herein both cancel the job and save the job to some type of job storage medium. The described print devices implement a user interface that allows a user to recall a saved print job from the job storage medium and to print the recalled print job.

DETAILED DESCRIPTION

Figure 1:
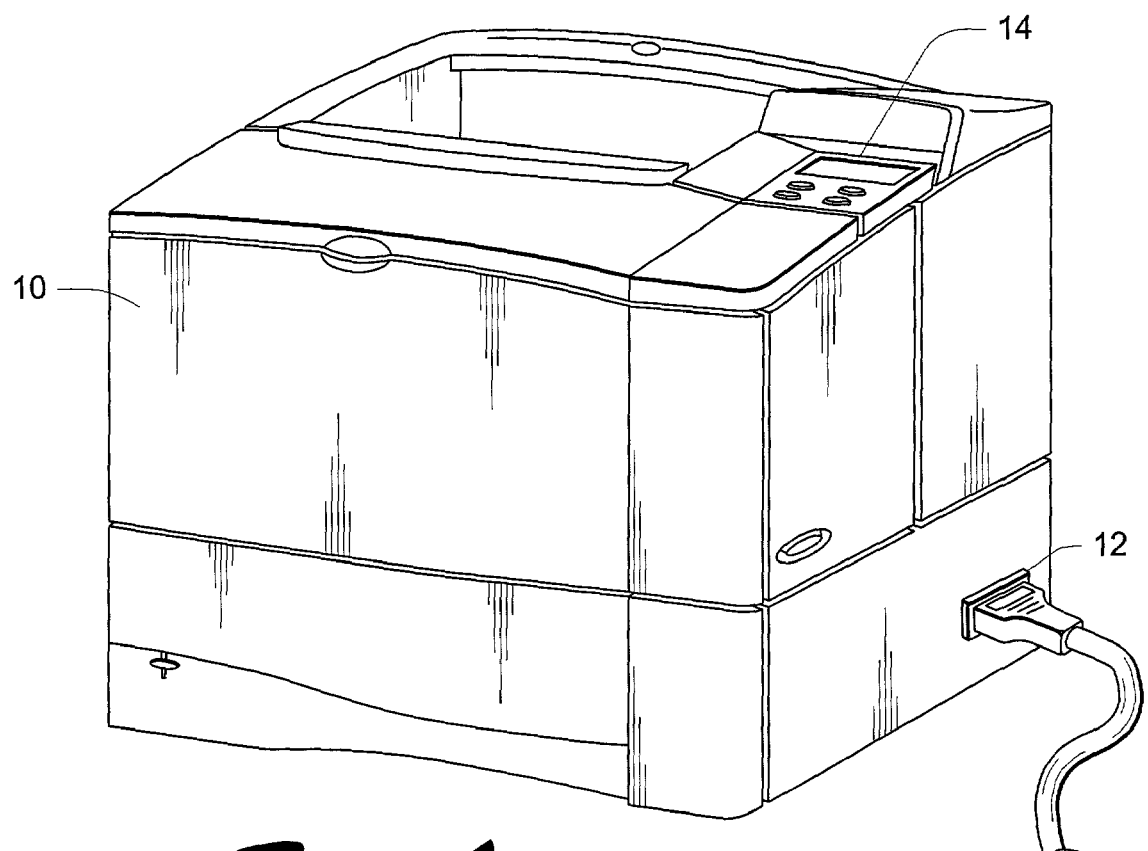
FIG. 1 is a block diagram showing pertinent components of an exemplary print device.

FIG. 1 shows a printer or other print device 10 in accordance with an embodiment of the invention. Examples of print devices include laser-based printers, ink-jet printers, dot-matrix printers, and others. Such print devices can be configured as personal printers associated with individual computers, workgroup or network-based printers or copiers, so-called multi-function products (MFPs), and other types of devices that produce images based on received data.

Print device 10 has one or more communications ports 12 through which it receives individual print jobs. Each print job typically comprises a data structure or sequence of data values formatted in accordance with a predetermined protocol such as PCL (printer control language), Postscript, PDF (portable document format, defined by Adobe Systems Incorporated), HTML (hyper-text markup language), PJL (printer job language), etc. Each print job is typically terminated with some predetermined data value that acts as an "end-of-job" indicator, and which delineates between successive print jobs.

Communications ports 12 may include parallel or serial ports, network ports, infrared communications ports, and/or other types of data ports that allow data and print jobs to be provided to printer 10. Print jobs are typically provided to printer 10 by one or more computers or computer-like devices (not shown) through the communications ports 12 of printer 10.

Figure 2:
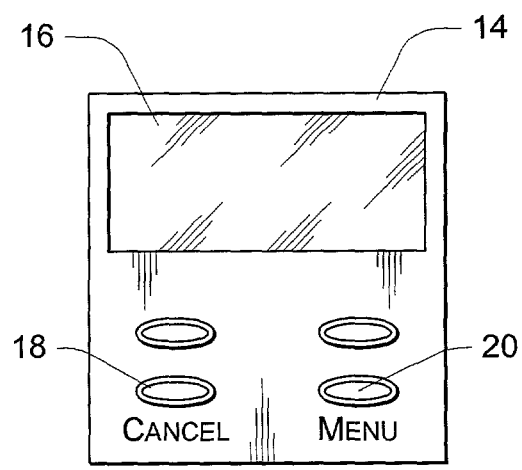
FIG. 2 shows a control panel of the print device shown in FIG. 1.

Print device 10 has a control panel or user interface 14, which is shown in more detail in FIG. 2. In this embodiment, control panel 14 comprises a status display 16 and a cancel input or key 18 that can be selected by a user. In addition, FIG. 2 shows a "Menu" key or input 20 that can be selected by a user to initiate various functions of the printer. Other keys or inputs, not specifically labeled, are used to navigate through a displayed menu and select different options. This might involve more or less keys than the number shown. Furthermore, the functionality of the cancel input 18 and other keys might be implemented in different ways, such as by way of menu selections, by programmable "soft" keys, by displayed controls on a touch-sensitive display, etc.

Figure 3:
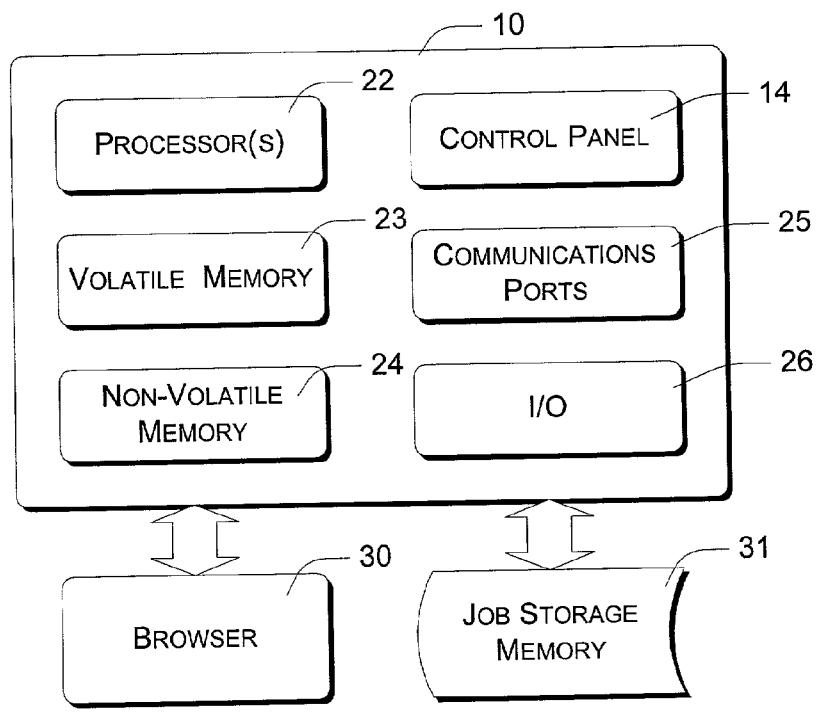
FIG. 3 is a block diagram showing pertinent functional component of the print device of FIG. 1 and components that can be associated with the print device.

FIG. 3 shows pertinent operational components of printer 10, including one or more processors 22, volatile memory 23, non-volatile memory 24, communications components or ports 25, and I/O components 26 that allow processor 22 to control various electro-mechanical and electro-optical components of printer 10 in order to transform received printing instructions into printed pages. FIG. 3 also shows control panel 14. Processor 22 is configured by way of instructions stored in memory 23 and 24 to perform normal printing operations, and to perform the unique functions that will be described in more detail below.

Note that while the functionality of printer 10 is described as being implemented with a programmable processor, associated memory, and program instructions that are retrieved from the memory and executed in sequence by the processor, the functionality might alternatively be implemented with various types of configurable, non-instruction-based components such as ASICs (application-specific integrated circuits), by so-called "hard-wired" logic, or by other existing or yet-to-be-developed technologies.

In addition to components implemented within printer 10, the printer functionality may be accessed, selected, configured, or controlled by means of an external, computer-based browser 30 or by some other type of control software or driver executing on a remote or non-local computer or computer-like device. In addition, the printer utilizes job storage memory 31 in a manner that will be described below. Job storage memory 31 may be non-local or external to printer 10 as illustrated, and accessed through a local area network, some other type of network, or through other data communications means. Alternatively, job storage memory might be implemented locally, within printer 10. Job storage memory might comprise magnetic-based memory such as one or more hard disks; one of any number of different types of electronic, randomly-addressable memory; or some other type of data storage media.

Figure 4:
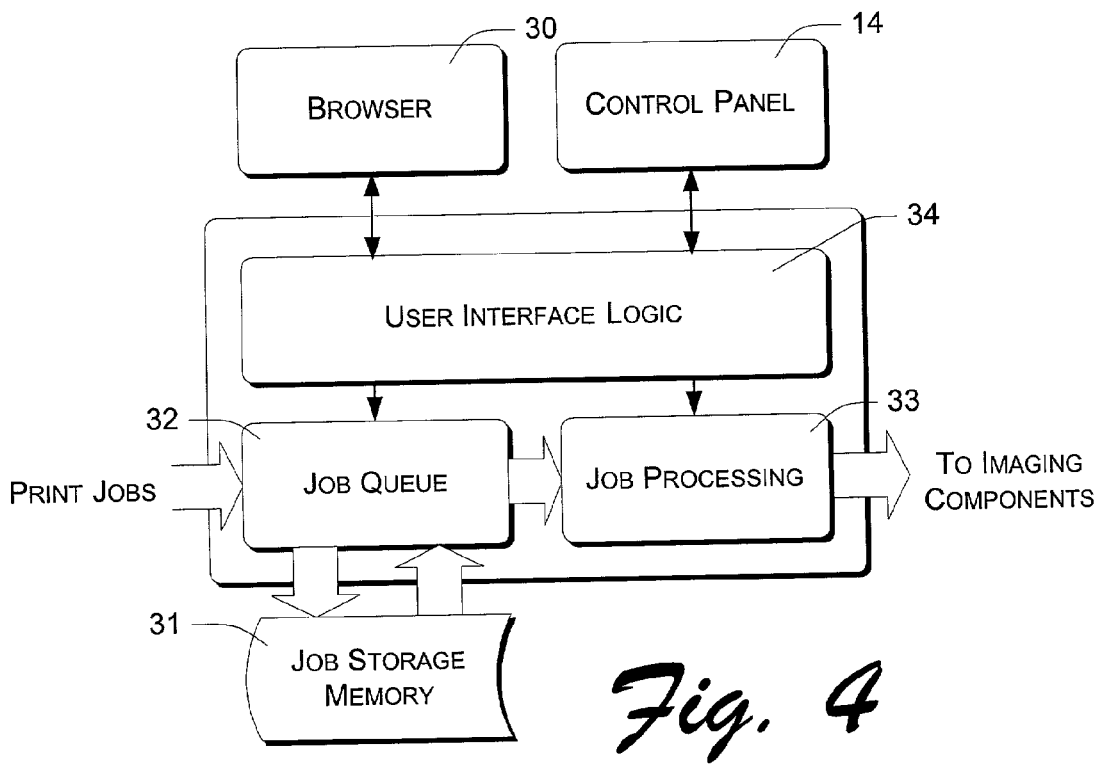
FIG. 4 is a block diagram showing logical components implemented at least in part by the functional components of FIG. 3.

FIG. 4 illustrates relevant logical functionality implemented by the processor-based system illustrated in FIG. 3. Logical components include a job queue 32, job processing logic 33, and user interface logic 34. User interface logic 34 includes logic that underlies the functionality of control panel 14, including logic that is responsive to cancel input 18 to cancel print jobs. Optionally, user interface logic 34 includes an HTTP (hyper-text transfer protocol) or Java-based server that operates in conjunction with a remote, computer-based browser 30 or some other type of external, graphical client component to configure and control printer 10. Communications between user interface logic 34 and such a client is typically through some type of network medium, although other communications media might alternatively be used.

When a print job is received at a communications port 25, it is stored in job queue 32. From there, job processing logic 33 retrieves print jobs on a first-come, first-served basis and takes the necessary steps to print the documents defined by the print jobs.

User interface logic 34 is responsive to cancel input 18 (FIG. 2) to cancel one or more print jobs. In many cases, the user interface logic responds to user selection of cancel input 18 by canceling the current print job—the print job that is currently being processed. However, more sophisticated job cancellation functionality might be provided, allowing the user to cancel queued print jobs, to select a future time period during which received print jobs will be cancelled, and/or to specify a cancellation count indicating a number of print jobs that are to be cancelled. Jobs are cancelled by removing them from job queue 32 and/or by instructing job processing logic 33 to terminate its processing activities with respect to jobs that are already being processed.

In addition to canceling one or more print jobs, the logic of printer 10 is configured to respond to selection of the cancel input by saving any cancelled print job in job storage memory 31 for potential subsequent retrieval, processing, and printing. If the canceled print job has not yet been initiated by job processing logic 33, this involves simply moving the print job from queue 32 to job storage memory 31. In the case of a canceled job that has already been partially processed, it may be necessary to ensure that processed portions of the print job remain in queue 32 until the print job is completed, so that the entire print job can be saved to job storage memory 31 if it is cancelled before it has completed printing. Alternatively, the print job may be saved to job storage memory 31 incrementally as it is printed, and then deleted from job storage memory 31 if the print job completes without being cancelled. If the job is canceled before completion, remaining portions of the print job are saved to job storage memory 31 along with the initially, previously saved portions.

In one embodiment, cancelled print jobs are saved automatically, without explicit user intervention. In another embodiment, the user interface might prompt the user regarding whether the cancelled job should be saved. The number of jobs residing in job storage memory 36 at any given time is of course limited by the available amount of storage, and older print jobs are deleted from job storage memory 36 as necessary in order to make room for more recently cancelled print jobs. The amount of storage to use for this purpose, as well as the network location of storage 36, can be configured by the administrator of the printer.

Although the described embodiment shows job storage memory 31 as being separate from print queue 32, some embodiments might utilize the queue itself to store canceled print jobs, by simply flagging the cancelled jobs as "inactive" within the queue. Recalling and reinitiating a cancelled print job in embodiments such as this would involve simply removing the "inactive" flag and alerting job processing logic 33 of the need to process this newly active print job.

User interface logic 34 implements a user interface in conjunction with control panel 14 and/or client browser 30 to allow a user to select a previously cancelled print job for printing. More specifically, the user interface can be instructed by selection of menu options to display a list of previously cancelled and saved print jobs. The print jobs can be identified in various ways, depending on the system. For example, it might be possible in some systems to identify the print jobs according to the users that submitted them. Alternatively, print jobs might be identified by the time of their submission, by the relative order of their submission, by the number of pages in each print job, or by any combination of these or other characteristics of the print jobs. By appropriate use of control panel keys in conjunction with display 16, the user can select one of the multiple previously saved print jobs for printing. Upon selecting a cancelled and saved print job, printer logic 34 moves the selected print job from job storage memory 31 back into job queue 32, from where it is retrieved, processed, and printed by job processing logic 33.

Optionally, the menu structure implemented on control panel 14 by user interface logic 34 might allow the user to select a number of copies of the selected print job for printing. That is, the user might be able to specify that the selected print job is to be executed a designated number of times, creating multiple copies of the document represented by the print job.

In addition, the ability to recall cancelled print jobs might be made available through client browser 30. That is, user interface logic 34 might implement a browser-based user interface that lists cancelled and saved print jobs and allows a user to select one or more of such print jobs for re-insertion into print job queue 32.

Figure 5:
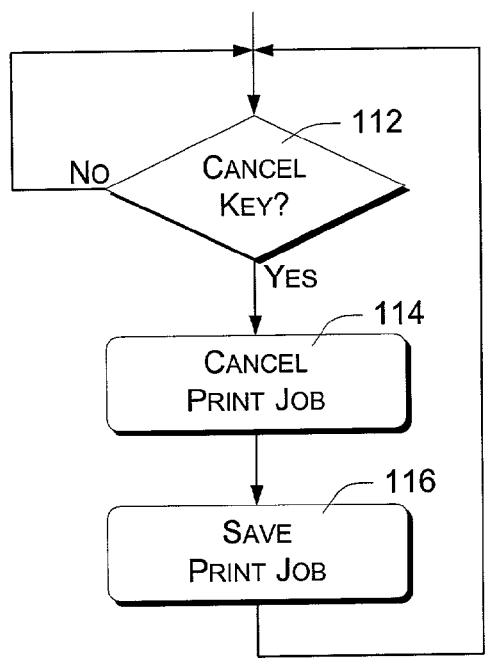
FIGS. 5 and 6 are flowcharts showing methodological aspects of the invention.

FIG. 5 shows methodological aspects implemented by the printer components discussed above. A decision block 112 comprises monitoring the cancel key or input to detect a user instruction to cancel a print job. If the cancel key is selected or activated, execution goes to block 114, which comprises canceling the current print job. Subsequently, or concurrently, an action 116 is performed, which comprises saving the canceled print job to job storage memory 31 for potential subsequent printing. As described above, the actual location of job storage memory 31 is specified as a configuration parameter of the printer, and can be either a local storage medium or some non-local storage medium that is accessible through a network medium or other communication means. Execution then returns to decision block 112 to again monitor for further selections of the cancel key.

Figure 6:
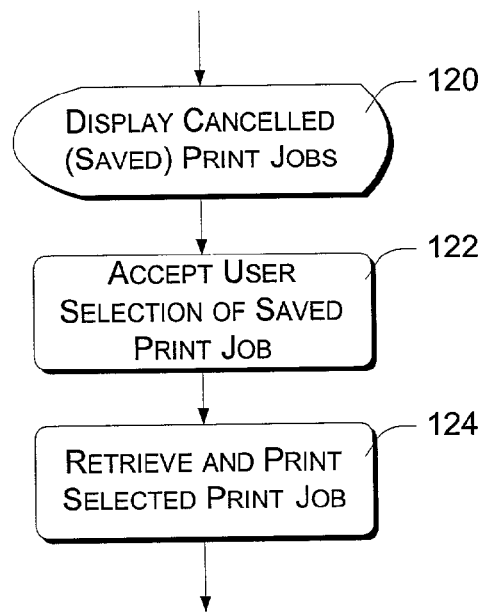

FIG. 6 shows methodological aspects related to a user interface through which a user may select previously cancelled jobs and instruct the printer to print such previously cancelled jobs. The user interface can be implemented in conjunction with control panel 14 or in conjunction with browser 30. The steps shown by FIG. 6 are implemented by the user interface logic shown in FIG. 4.

An action 120 comprises displaying a list of previously cancelled and saved print jobs. The jobs are identified by various characteristics as described above, such as the times the jobs were received, the numbers of pages in the jobs, etc.

An action 122 comprises accepting a selection of a particular one of the displayed print jobs. The user will typically move a focus, cursor, or highlight through the listed print jobs and then activate some selection control such as an "enter" key. When using a browser-based interface, the user will simply click or double-click on the desired print job. Optionally, the user may be allowed to enter a count of the number of copies to be printed.

An action 124, performed in response to the user instruction completed in action 122, comprises recalling the selected print job by retrieving the selected print job from job storage memory 31 and submitting the print job to job queue 32 and job processing logic 33 for printing.

Although FIGS. 5 and 6 indicate specific methodological implementations, it should be recognized that there are many different ways of implementing the described features and of allowing a user to cancel jobs and to specify previously cancelled jobs for re-initialization within job queue 32 of printer 10.

The techniques described above allow a user to recover more easily when a print job has been canceled. Rather then resubmitting the print job, the user can simply recall the print job from the control panel of the printer. Furthermore, the techniques allow a degree of flexibility that was previously not available. For example, a user can now safely cancel another person's print job in order to expedite his or her own print job, and then recall the canceled print job so that it can complete without further interference. The other person's cooperation is not required, and in many cases the other person will not even be aware that his or her job was canceled and recalled.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claim is:

1. A print device that receives print jobs, comprising:
a cancel input that is selectable by a user; and
logic that is responsive to selection of the cancel input to cancel a print job, to remove the cancelled print job from a job queue, and to save the cancelled print job to a memory for potential subsequent printing.

2. A print device as recited in claim 1, wherein the cancel input is a cancel key.

3. A print device as recited in claim 1, further comprising a storage medium having the memory to which the logic saves the cancelled print job.

4. A print device as recited in claim 1, wherein the logic is configured to save the cancelled print job to a memory on a non-local storage medium.

5. A print device as recited in claim 1, further comprising a user interface configured to allow the user to select a previously cancelled print job for printing.

6. A print device as recited in claim 1, further comprising user interface logic configured to allow the user to select a previously cancelled print job for printing.

7. A print device as recited in claim 1, further comprising user interface logic configured to allow the user to select one of multiple previously cancelled print jobs for printing.

8. A print device as recited in claim 1, further comprising user interface logic configured to allow the user to select a number of copies of a previously cancelled print job for printing.

9. A print device as recited in claim 1, further comprising a user interface configured to allow the user to select a number of copies of a previously cancelled print job for printing.

10. A print device as recited in claim 1, further comprising logic configured to, in response to a user selection to print a previously cancelled print job, retrieve the print job from the memory and submit the print job to the job queue for printing.

11. A print device that receives print jobs, comprising:
a cancel input that is selectable by a user;
logic that is responsive to selection of the cancel input to cancel a print job and to save the cancelled print job for potential subsequent printing; and
user interface logic that implements a browser-based user interface in conjunction with a remote browser, wherein the browser-based user interface allows the user to select from multiple previously cancelled print jobs for printing.

12. In a print device that receives print jobs, a method performed in response to a user instruction to cancel a print job, comprising:
cancelling the print job;
removing the cancelled print job from a job queue; and
saving the cancelled print job to a memory for potential subsequent printing.

13. A method as recited in claim 12, further comprising retrieving the previously cancelled print job for printing.

14. A method as recited in claim 12, further comprising retrieving the previously cancelled print job for printing in response to a user instruction.

15. A method as recited in claim 12, further comprising detecting activation of a cancel key that forms the user instruction to cancel the print job.

16. A method as recited in claim 12, further comprising detecting selection of a cancel input that forms the user instruction to cancel the print job.

17. A method as recited in claim 12, wherein said saving comprises saving the cancelled print job to a memory on a storage medium that is local to the print device.

18. A method as recited in claim 12, wherein said saving comprises saving the cancelled print job to a memory on a storage medium that is not local to the print device.

19. A method as recited in claim 12, further comprising allowing the user to select a previously cancelled print job for printing.

20. A method as recited in claim 12, further comprising allowing the user to select one of multiple previously cancelled print jobs for printing.

21. A method as recited in claim 12, further comprising, in response to a user selection to print a previously cancelled print job, retrieving the print job from the memory and submitting the print job to the job queue for printing.

22. A method as recited in claim 12, further comprising allowing the user to select a number of copies of a previously cancelled print job for printing.

23. A print device configured to perform actions comprising:
   receiving multiple print jobs;
   cancelling designated print jobs in response to user input;
   moving the cancelled print jobs to a job storage memory; and
   recalling a previously cancelled print job from the job storage memory for subsequent printing.

24. A print device as recited in claim 23, wherein recalling a previously cancelled print job comprises displaying a list of previously cancelled print jobs.

25. A print device as recited in claim 23, wherein recalling a previously cancelled print job comprises displaying a list of previously cancelled print jobs and allowing a user to select one of the displayed print jobs.

26. A print device as recited in claim 23, wherein cancelling designated print jobs is in response to selection of a cancel input on the printer.

27. A print device as recited in claim 23, wherein moving the cancelled print jobs comprises automatically saving the cancelled print jobs to the jobs storage memory.

28. A print device as recited in claim 23, wherein moving the cancelled print jobs comprises saving the cancelled print jobs to a job storage memory on a storage medium that is local to the print device.

29. A print device as recited in claim 23, wherein moving the cancelled print jobs comprises saving the cancelled print jobs to a job storage memory on a storage medium that is not local to the print device.

* * * * *

UNITED STATES PATENT AND TRADEMARK OFFICE
CERTIFICATE OF CORRECTION

| | |
|---|---|
| PATENT NO. | : 7,345,777 B2 |
| APPLICATION NO. | : 09/954350 |
| DATED | : March 18, 2008 |
| INVENTOR(S) | : Samuel M. Lester et al. |

It is certified that error appears in the above-identified patent and that said Letters Patent is hereby corrected as shown below:

In column 8, line 8, in Claim 27, after "to the" delete "jobs" and insert -- job --, therefor.

Signed and Sealed this

Nineteenth Day of August, 2008

JON W. DUDAS
*Director of the United States Patent and Trademark Office*